(12) United States Patent
Hatano

(10) Patent No.: US 7,218,345 B2
(45) Date of Patent: May 15, 2007

(54) NOTIFYING AVAILABLE CAPACITY OF IMAGE-DATA RECORDING MEDIUM

(75) Inventor: Kazuhiko Hatano, Taichung (TW)

(73) Assignee: Canon Kabushiki Kaisha, Tokyo (JP)

( * ) Notice: Subject to any disclaimer, the term of this patent is extended or adjusted under 35 U.S.C. 154(b) by 877 days.

(21) Appl. No.: 10/366,733

(22) Filed: Feb. 14, 2003

(65) Prior Publication Data

US 2003/0222993 A1   Dec. 4, 2003

(30) Foreign Application Priority Data

Feb. 15, 2002  (JP)  ............................. 2002-038872

(51) Int. Cl.
*H04N 5/76* (2006.01)
*H04N 5/222* (2006.01)
*H04N 1/00* (2006.01)

(52) U.S. Cl. ............................. 348/231.1; 348/333.02; 358/404

(58) Field of Classification Search .............. 348/231.1
See application file for complete search history.

(56) References Cited

U.S. PATENT DOCUMENTS

| | | | | |
|---|---|---|---|---|
| 5,016,107 A | * | 5/1991 | Sasson et al. | ............ 348/231.6 |
| 5,473,370 A | * | 12/1995 | Moronaga et al. | ........ 348/231.1 |
| 5,481,303 A | * | 1/1996 | Uehara | .................... 348/231.1 |
| 5,633,976 A | * | 5/1997 | Ogino | ......................... 386/120 |
| 6,249,313 B1 | * | 6/2001 | Nishi | ....................... 348/231.1 |
| 6,661,454 B1 | * | 12/2003 | Hwang et al. | ............ 348/231.9 |
| 6,862,106 B1 | * | 3/2005 | Matsushima | ............. 348/231.1 |
| 2001/0000969 A1 | * | 5/2001 | Ohta et al. | ............. 348/333.02 |
| 2003/0117503 A1 | * | 6/2003 | Miyashita | ................. 348/231.1 |

FOREIGN PATENT DOCUMENTS

JP   2000278579   10/2000

* cited by examiner

*Primary Examiner*—David Ometz
*Assistant Examiner*—Nhan Tran
(74) *Attorney, Agent, or Firm*—Morgan & Finnegan, L.L.P.

(57) ABSTRACT

The number of images recordable in a plurality of recording media, which are used for recording sensed image data in different purposes, is notified to a user. First, an available recording capacity of a recording medium incorporated in an image processing apparatus and an available recording capacity of a recording medium which is detachable from the image processing apparatus are calculated. Based on the calculated results, the smaller capacity is determined, and an indication with respect to this capacity is displayed.

4 Claims, 7 Drawing Sheets

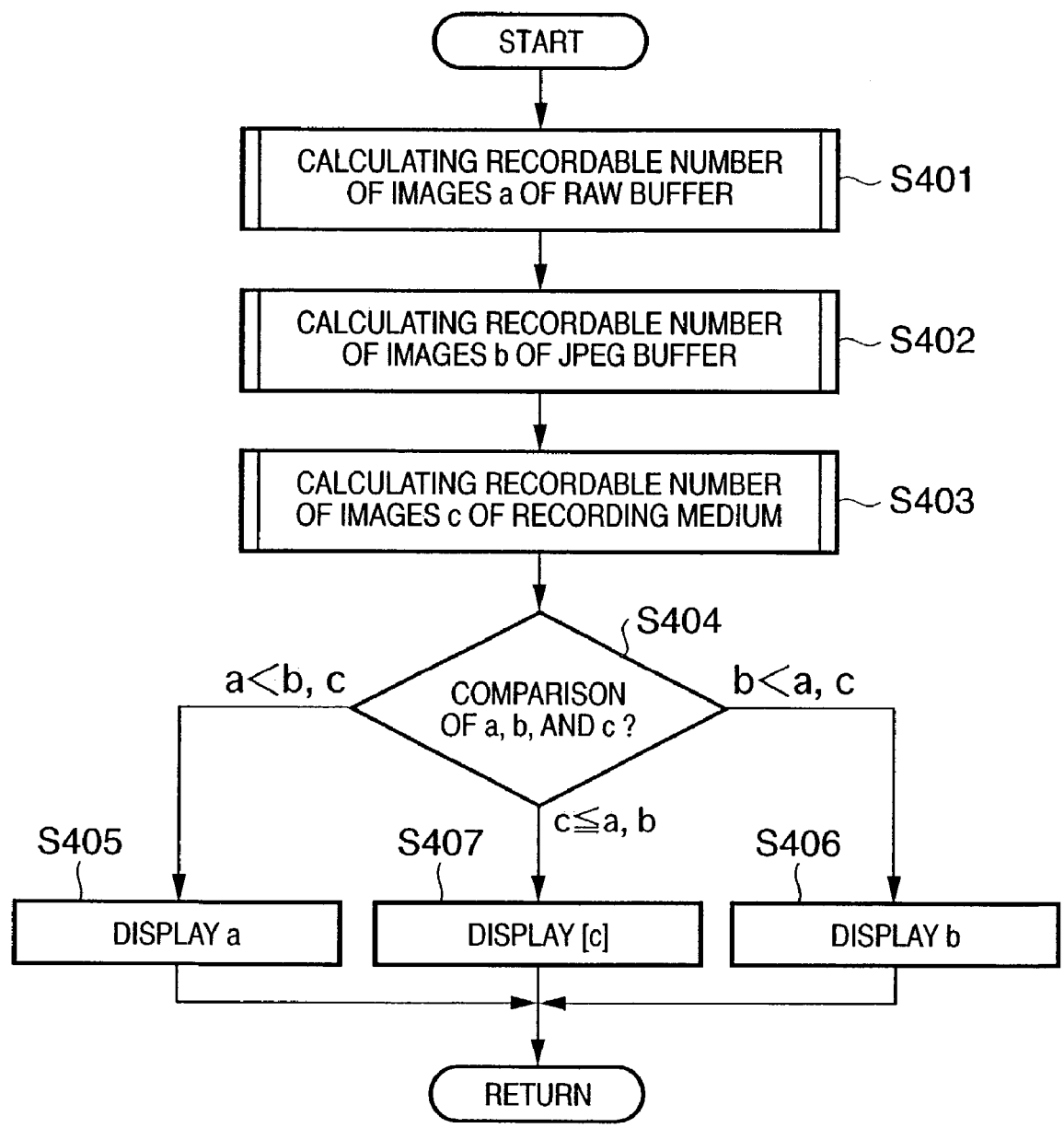

NOTIFYING AVAILABLE CAPACITY OF IMAGE-DATA RECORDING MEDIUM

FIELD OF THE INVENTION

The present invention relates to notifying a user of a remaining image-data recording capacity of a storage medium and a detachable recording medium, which records image data.

BACKGROUND OF THE INVENTION

Conventionally, in a digital camera capable of sequential image sensing which incorporates a storage medium for temporarily storing a plurality of sequentially sensed images, it is known that the camera notifies prohibition/invalidity of sequential image sensing to a user when the storage medium lacks a sufficient remaining capacity, as disclosed in Japanese Patent Application Laid-Open No. 2000-278579.

However, although the above conventional art can give a warning to a user about a shortage of the remaining capacity of the storage medium, in a case where the recordable number of images of, e.g., a compact flash (CF) card falls below the recordable number of images of the storage medium, it cannot give a warning to a user that not all the sequentially sensed images can be recorded in the inserted CF card.

SUMMARY OF THE INVENTION

The present invention has been made in consideration of the above situation, and has as its object to avoid failure of sequential image sensing, which is caused by not realizing the remaining capacity of a recording medium running low.

According to the present invention, the foregoing object is attained by providing an image processing apparatus comprising: a first recording medium adapted to record image data; a determination unit adapted to determine an available recording capacity of the first recording medium and an available recording capacity of a second recording medium, which records the image data and is detachable from the image processing apparatus; and a display unit adapted to display an indication with regard to a smaller available recording capacity determined by the determination unit.

According to the present invention, the foregoing object is also attained by providing an image processing method of an image processing apparatus for processing image data, the apparatus having a first recording medium which records the image data, comprising: determining an available recording capacity of the first recording medium and an available recording capacity of a second recording medium, which records the image data and is detachable from the image processing apparatus; and displaying on a display unit an indication with regard to a smaller available recording capacity, which is determined in the determination.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a flowchart showing a recordable number display routine of the image processing apparatus according to the embodiment of the present invention.

DETAILED DESCRIPTION OF THE PREFERRED EMBODIMENT

A preferred embodiment of the present invention will now be described in detail in accordance with the accompanying drawings.

Figure 1:
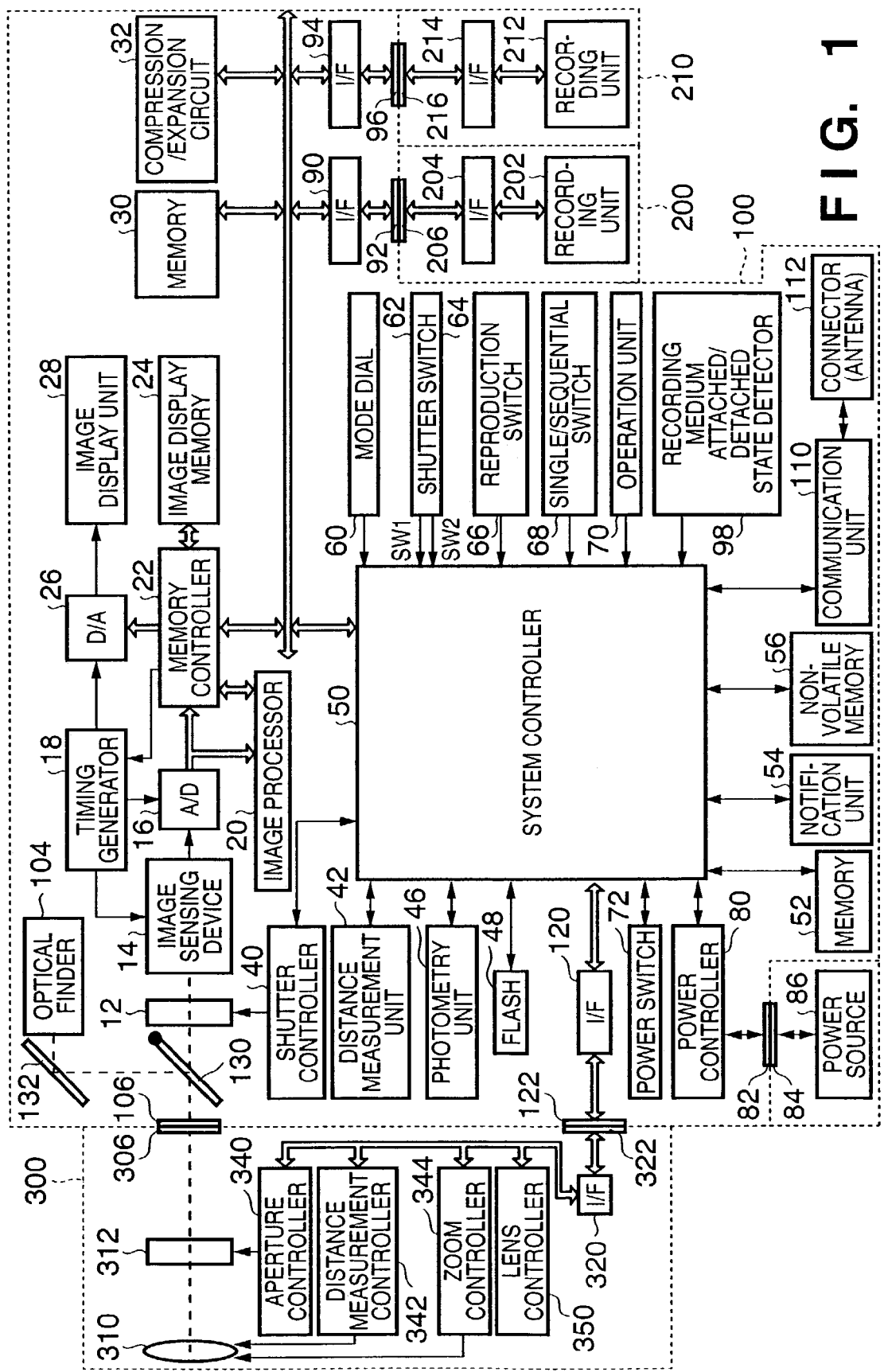
FIG. 1 is a block diagram showing a configuration of an image processing apparatus according to an embodiment of the present invention.

FIG. 1 is a block diagram showing a configuration of an image processing apparatus according to the embodiment of the present invention. In FIG. 1, reference numeral 100 denotes an image processing apparatus. In the image processing apparatus 100, 12 denotes a shutter for controlling the amount of exposure to an image sensing device 14; and 14, the image sensing device which converts an optical image into an electric signal. A ray of light incident upon a lens 310 is directed to the image sensing device 14 through an aperture 312, lens mounts 306 and 106, a mirror 130 and a shutter 12 in a single-lens reflex camera, and an optical image is formed on the image sensing device 14. Numeral 16 denotes an A/D converter which converts an analog signal output from the image sensing device 14 into a digital signal.

Numeral 18 denotes a timing generator which supplies a clock signal and a control signal to the image sensing device 14, an A/D converter 16, and a D/A converter 26, under the control of a memory controller 22 and a system controller 50. Numeral 20 denotes an image processor which performs predetermined pixel interpolation processing, color conversion processing and the like on image data from the A/D converter 16 or image data from the memory controller 22.

The image processor 20 performs predetermined calculation processing as necessary using the sensed image data, and the system controller 50 performs through-the-lens (TTL) autofocus (AF) processing, auto exposure (AE) processing, pre-flash (EF) processing with respect to a shutter controller 40 and a distance measurement unit 42, based on the result of calculations. Further, the image processor 20 performs predetermined calculation using the sensed image data, and performs TTL auto white balance (AWB) processing based on the result of calculations.

Note since the present embodiment comprises the dedicated distance measurement unit 42 and photometry unit 46, each of the AF processing, AE processing, and EF processing may be performed using the distance measurement unit 42 and photometry unit 46, instead of performing the AF processing, AE processing, and EF processing using the image processor 20. Alternatively, each of the AF processing, AE processing, and EF processing may be performed using the distance measurement unit 42 and photometry unit 46, in addition to performing each of the AF processing, AE processing, and EF processing using the image processor 20.

The memory controller 22 controls the A/D converter 16, the timing generator 18, the image processor 20, an image display memory 24, the D/A converter 26, a memory 30, and a compression/expansion circuit 32. The image data outputted from the A/D converter 16 is written into the image display memory 24 or memory 30 via the image processor 20 and the memory controller 22, or only via the memory controller 22.

Numeral 24 denotes the image display memory; 26, the D/A converter; and 28, an image display unit comprising a TFT LCD or the like. Image data written into the image display memory 24 is displayed on the image display unit 28 via the D/A converter 26. An electronic finder function can be realized by sequentially displaying sensed images on the image display unit 28. Further, the image display unit 28 can arbitrarily change the display contents in accordance with an instruction from the system controller 50.

The memory 30, used for storing obtained still images and moving images, has a sufficient storage capacity for storing a predetermined number of still images and a moving image for a predetermined period. Accordingly, in a case of sequential image sensing to sequentially obtain plural numbers of still images or a case of panoramic image sensing, a large amount of image data can be written into the memory 30 at high speed. Further, the memory 30 may be used also as a work area for the system controller 50.

The compression/expansion circuit 32 compresses or expands image data by adaptive discrete cosine transformation (ADCT) or the like. The compression/expansion circuit 32 reads image data stored in the memory 30 and performs compression or expansion processing on the read image data, and writes the processed data into the memory 30. The shutter controller 40 controls the shutter 12 based on the photometry data from the photometry unit 46 while interlocking with an aperture controller 340 which controls the aperture 312.

The distance measurement unit 42 is arranged for performing AF processing, and a ray of light incident upon the lens 310 is directed to the distance measurement unit 42 through the aperture 312, lens mounts 306 and 106, mirror 130, and a distance-measurement sub-mirror (not shown) in a single-lens reflex camera, thereby measuring a focus state of the optical image formed.

The photometry unit 46 is arranged for performing AE processing, and a ray of light incident upon the lens 310 is directed to the photometry unit 46 through the aperture 312, lens mounts 306 and 106, mirrors 130 and 132, and a photometry lens (not shown) in a single-lens reflex camera, thereby measuring an exposure state of the optical image formed. Furthermore, the photometry unit 46 also comprises the EF processing function by interlocking with a flash 48. The flash 48 also has an AF auxiliary light projection function and a flash adjusting function.

The system controller 50 can perform exposure control and AF control in accordance with the result of calculations performed by the image processor 20 based on the image data sensed by the image sensing device 14, by utilizing the TTL method that controls the shutter controller 40, aperture controller 340, and distance measurement controller 342. AF control may be performed by utilizing both the measurement result of the distance measurement unit 42 and the calculation result calculated by the image processor 20 based on the image data sensed by the image sensing device 14. Exposure control may be performed by utilizing both the measurement result of the photometry unit 46 and the calculation result calculated by the image processor 20 based on the image data sensed by the image sensing device 14.

The system controller 50 controls the overall image processing apparatus 100. Memory 52 stores the constants, variables, and programs for operation of the system controller 50. Numeral 54 denotes a notification unit, e.g., a liquid crystal display device, speaker and the like, which notifies operating statuses, messages and the like by using characters, images, sound and the like, in correspondence with execution of a program by the system controller 50. The notification unit 54 comprises one or more combinations of display devices including an LCD and an LED for visual notification and sound generating devices for audio notification. Especially, the display device or devices is/are provided in a single or plural visually-recognizable positions around an operation unit 70 of the image processing apparatus 100. Further, a part of functions of the notification unit 54 is provided within an optical finder 104.

The display contents of the notification unit 54, displayed on the LCD or the like include the indications of single shot/sequential image sensing, self timer, compression rate, the number of recording pixels, the number of recorded images, the number of recordable images, shutter speed, an f number (aperture), exposure compensation, flash illumination, pink-eye mitigation, macro image sensing, a buzzer-set state, a timer battery level, a battery level, an error state, information displayed in plural digit numbers, attached/detached status of recoding media 200 and 210, attached/detached status of a lens unit 300, operation of communication I/F, date and time, and a connection state of an external computer.

Further, the display contents of the notification unit 54, displayed within the optical finder 104 include a focus state, an image-sensing-ready state, camera shake warning, a flash charging state, a flash-charge completion state, shutter speed, an f number (aperture), exposure compensation, and a data writing state.

Further, the display contents of the notification unit 54, displayed on the LED or the like include the focus state, image-sensing-ready state, camera shake warning, flash charging state, flash-charge completion state, data writing state, macro-image-sensing set state, and secondary battery charging state. The display contents of the notification unit 54, displayed by a lamp or the like include a self-timer notification lamp or the like. The self-timer notification lamp may be used commonly with the AF auxiliary light. Numeral 56 denotes an electrically erasable and recordable nonvolatile memory, such as an EEPROM.

Numerals 60, 62, 64, 66, 68 and 70 denote operation units for inputting various operation instructions to the system controller 50, comprising a single or plurality of combinations of switches, dials, touch panels, a device for pointing by line-of-sight detection, a voice recognition device, and the like.

Next, the operation units will be described in more detail. Numeral 60 denotes a mode dial switch for selecting various function modes, such as an automatic image sensing mode, a program image sensing mode, a shutter-speed priority mode, an f-number priority mode, a manual image sensing mode, a focal-depth priority mode, a portrait image sensing mode, a landscape image sensing mode, a close-up image sensing mode, a sport image sensing mode, a nightscape image sensing mode, and a panoramic image sensing mode.

Numeral 62 denotes a shutter switch (SW1) turned ON by half stroke of a shutter button (not shown), to instruct start of the operations of the AF processing, the AE processing, the AWB processing, the EF processing and the like. Numeral 64 denotes a shutter switch (SW2) turned ON by full stroke of the shutter button (not shown), to instruct start of a series of operations including exposure processing to write a signal read from the image sensing device 14 into the memory 30 via the A/D converter 16 and the memory controller 22, development processing by using calculations by the image processor 20 and the memory controller 22, and recording processing to read the image data from the memory 30, compress the image data by the compression/expansion circuit 32, and write the compressed image data into the recording medium 200 or 210.

Numeral 66 denotes a reproduction switch which instructs start of a reproduction operation for reading an image, obtained in an image sensing mode, from the memory 30 or recording medium 200 or 210 and displaying the read image by the image display unit 28. Numeral 68 denotes a single/sequential switch for switching between a single-shot mode and a sequential mode. In the single-shot mode, after a frame of image is recorded by pressing the shutter switch (SW2) 64, the camera moves to a stand-by state. In the sequential mode, images are consecutively recorded while the shutter switch (SW2) 64 is pressed.

Numeral 70 denotes an operation unit comprising various buttons and touch panels including a menu button, a set button, a macro/non-macro selection button, a multi-image reproduction/repaging button, a flash setting button, a single-shot/sequential/self-timer image sensing selection button, a forward (+) menu item selection button, a backward (−) menu item selection button, a forward (+) reproduction image search button, a backward (−) reproduction image search button, an image sensing quality selection button, an exposure compensation button, a date/time set button, a selection button for selecting various functions at the time of executing image sensing or reproduction in the panoramic mode and the like, an execution button for setting various functions at the time of executing image sensing or reproduction in the panoramic mode and the like, an image display ON/OFF switch for setting ON/OFF of the image display unit 28, a quick review ON/OFF switch for setting the quick review function in which image data is automatically reproduced immediately after image sensing, a compression mode switch for selecting a compression rate of the JPEG compression or a RAW mode where a signal from the image sensing device 14 is digitalized and recorded in a recording medium without compression, a reproduction switch for setting various function modes such as a reproduction mode, multi-image reproduction/deletion mode, and PC connection mode, and AF mode setting switch capable of setting a one-shot AF mode which starts an autofocus operation when the shutter switch SW1 is pressed and maintains the focus state, or a servo AF mode which consecutively performs autofocus operation while the shutter switch SW1 is pressed. Further, with respect to each function of the aforementioned forward (+) and backward (−) buttons, a rotating dial may be provided to enable quick selection of numerals or functions.

Numeral 72 denotes a power switch which can select the power ON/OFF mode of the image processing apparatus 100. It can also select the power ON/OFF mode of various auxiliary devices, e.g., a lens unit 300, an external strobe light, recording media 200 and 210 and the like, connected to the image processing apparatus 100.

Numeral 80 denotes a power controller comprising a battery detection circuit, a DC-DC converter, a switch circuit to select the block to be energized, and the like. The power controller 80 detects the attached/detached state of the battery, the battery type and the remaining battery power level, controls the DC-DC converter based on the results of detection and an instruction from the system controller 50, and supplies a necessary voltage to the respective parts including the recording medium for the necessary period. Numerals 82 and 84 denote connectors; and 86, the power source comprising a primary battery such as an alkaline battery or a lithium battery, a secondary battery such as an NiCd battery, an NiMH battery or an Li battery, an AC adapter, and the like.

Numerals 90 and 94 denote interfaces for recording media such as a memory card or a hard disk; and 92 and 96, connectors for connecting with the recording media such as a memory card or a hard disk. A recording medium attached/detached state detector 98 detects whether the recording medium 200 and/or 210 is attached to the connector 92 and/or connector 96.

In the present embodiment, two systems of interfaces and connectors for connection with the recording media are employed. However, the number of systems is not limited, and a single or plurality of interfaces and connectors may be provided. Further, interfaces and connectors pursuant to different standards may be combined. As the interfaces and connectors, cards in conformity with Personal Computer Memory Card International Association standards (PCMCIA cards) and cards in conformity with compact flash® (CF) card standards may be used.

In a case where cards and connectors in conformity with the PCMCIA standards, CF card standards and the like are used as the interfaces 90 and 94 and the connectors 92 and 96, image data and management information attached to the image data can be transmitted/received with respect to other peripheral devices such as computers and printers by connection with various communication cards such as a LAN card, a modem card, a USB card, an IEEE 1394 card, a P1284 card, an SCSI card, and a communication card such as PHS card.

The optical finder 104 serves to direct a ray of light incident upon the lens 310 through the aperture 312, lens mounts 306 and 106, and mirrors 130 and 132 in a single-lens reflex camera, and an optical image is formed. The optical finder 104 can be used for image sensing without the electronic finder function by the image display unit 28.

Figure 6:
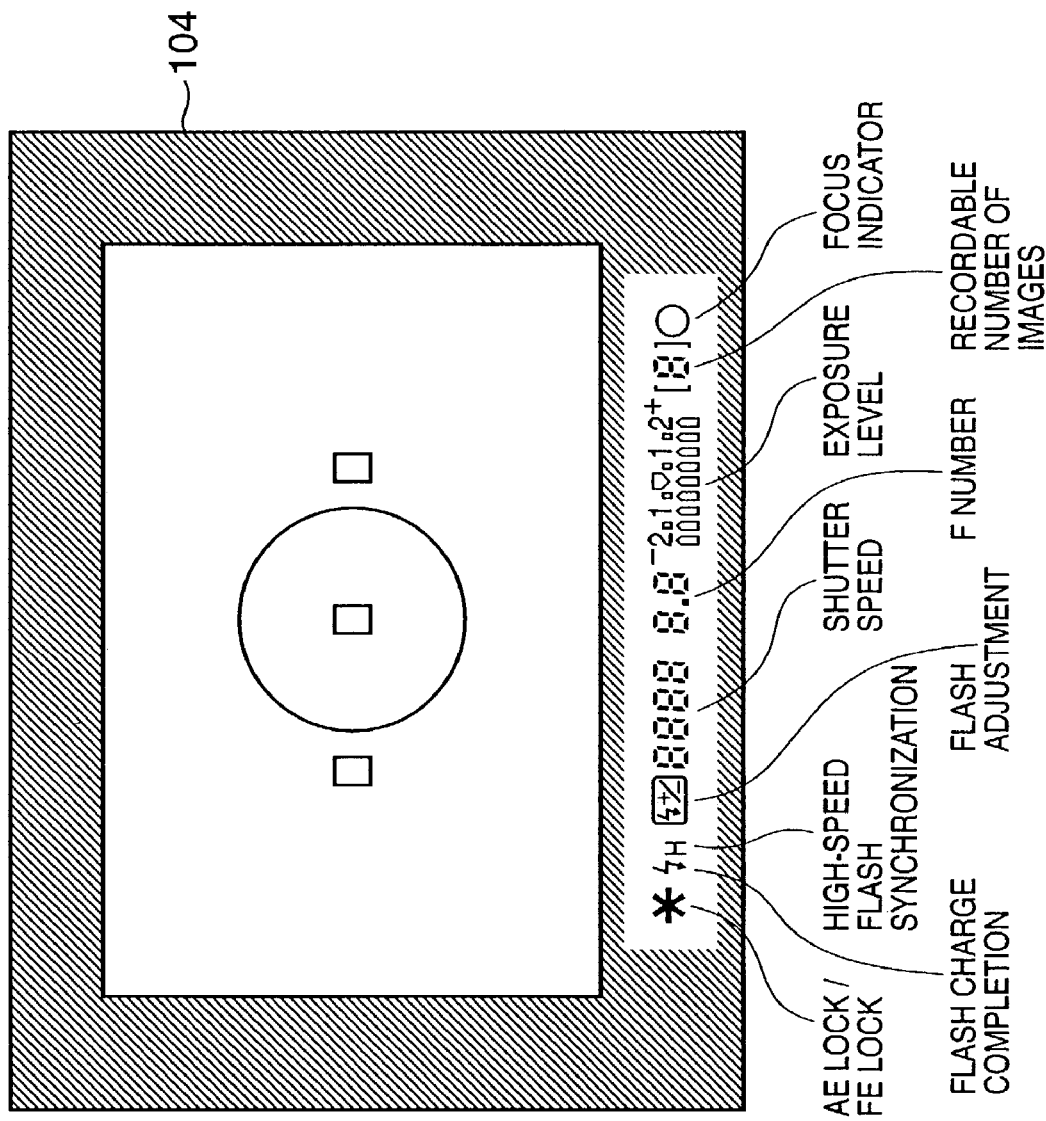
FIG. 6 shows a display example of an optical finder function of the image processing apparatus according to the embodiment of the present invention.

FIG. 6 shows a display example of the optical finder 104 according to the present embodiment. In addition to conventional functions, the display includes 7-segmented indicator that indicates the recordable number of images of the memory 30 for storing sensed still images or moving images or the recording medium 200 such as a memory card or a hard disk, and parentheses (e.g., [ ]) to indicate that the recordable number of images is of the recording medium 200.

Referring back to FIG. 1, numeral 110 denotes a communication unit comprising various communication functions, such as RS232C or USB, IEEE 1394, P1284, SCSI, modem, LAN, and wireless communication. Numeral 112 denotes a connector for connecting the image processing apparatus with other devices by the communication unit 110, or an antenna in a case of adopting wireless communication.

Numeral 120 denotes an interface for connecting the image processing apparatus 100 with the lens unit 300 in the lens mount 106; and 122, a connector for electrically connecting the image processing apparatus 100 with the lens unit 300. The connector 122 transmits/receives a control signal, a status signal, and a data signal between the image processing apparatus 100 and lens unit 300, and also supplies an electric current of various voltages. Furthermore, the connector 122 may also transmit/receive an optical signal, an audio signal and the like in addition to an electric signal.

The mirrors 130 and 132 serve to direct a ray of light incident upon the lens 310 to the optical finder 104 in a single-lens reflex camera. Note that the mirror 132 may be of a quick-return mirror or a half mirror.

The recording medium 200 includes a memory card, a hard disk or the like. The recording medium 200 has a recording unit 202 constructed with a semiconductor memory, a magnetic disk or the like, the interface 204 for communication with the image processing apparatus 100, and the connector 206 for connection with the image processing apparatus 100. The recording medium 210 includes a memory card, a hard disk or the like. The recording medium 210 has a recording unit 212 constructed with a semiconductor memory, a magnetic disk or the like, the interface 214 for communication with the image processing apparatus 100, and the connector 216 for connection with the image processing apparatus 100.

Numeral 300 denotes an exchangeable-type lens unit. Numeral 306 denotes a lens mount which mechanically connects the lens unit 300 with the image processing apparatus 100. The lens mount 306 includes various functions which electrically connect the lens unit 300 with the image processing apparatus 100. Numeral 310 denotes the image sensing lens; and 312, the aperture.

Numeral 320 denotes an interface which connects the lens unit 300 with the image processing apparatus 100 in the lens mount 306; and 322, a connector which electrically connects the lens unit 300 with the image processing apparatus 100. The connector 322 transmits/receives a control signal, a status signal, and a data signal between the image processing apparatus 100 and lens unit 300, and also is supplied with or supplies an electric current of various voltages. Furthermore, the connector 322 may also transmit/receive an optical signal, an audio signal and the like in addition to an electric signal.

Numeral 340 denotes an aperture controller which controls the aperture 312 based on photometry data from the photometry unit 46, while interlocking with the shutter controller 40 that controls the shutter 12; 342, a distance measurement controller which controls focusing of the image sensing lens 310; and 344, a zoom controller which controls zooming of the image sensing lens 310.

Numeral 350 denotes a lens system controller which controls the entire lens unit 300. The lens system controller 350 comprises a memory for storing constants, variables, and programs for operations, as well as a non-volatile memory for storing identification data such as a unique number of the lens unit 300, management information, function data such as an open aperture value, a minimum aperture value, a focal length and the like, present or past set values and so on.

Figure 2:
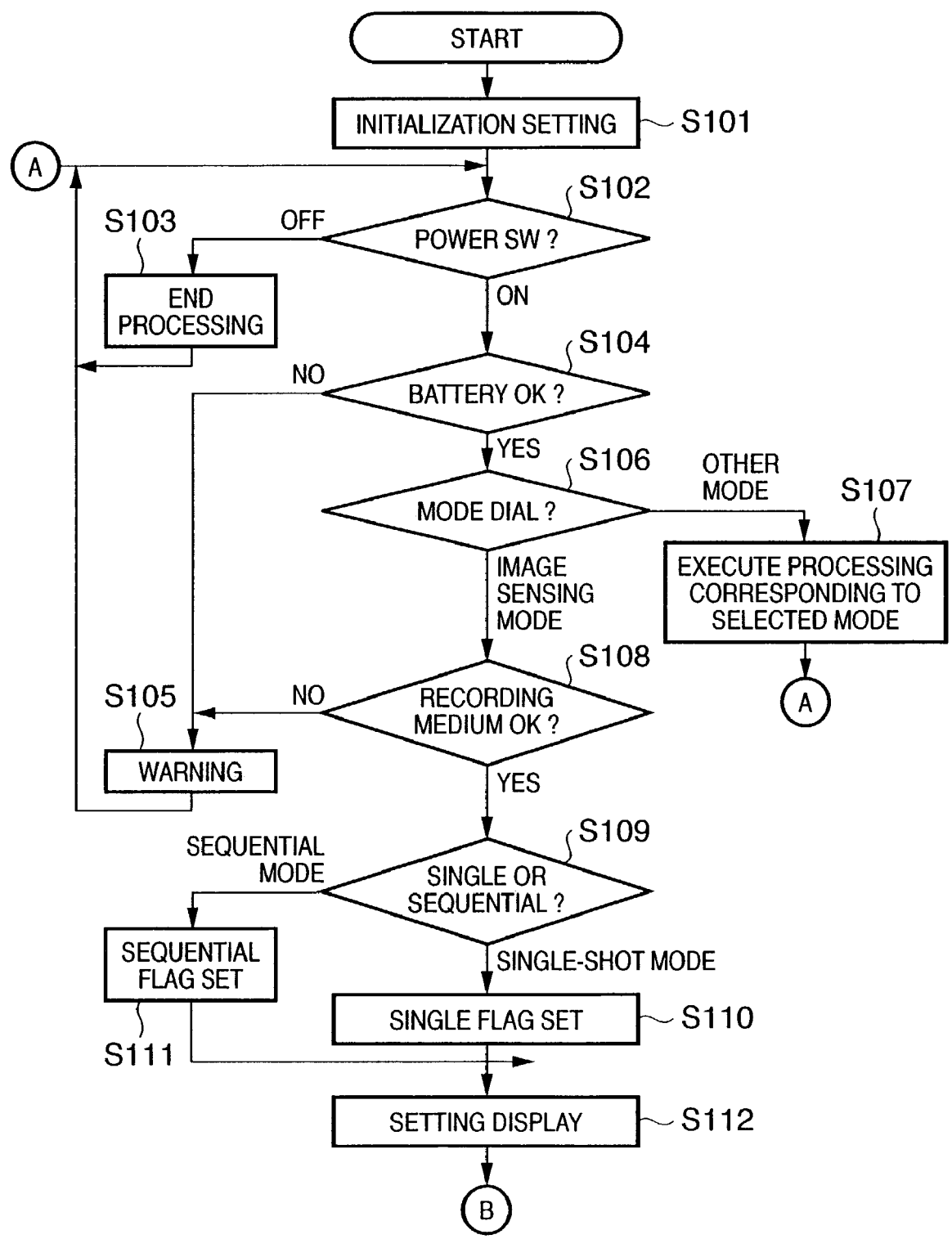
FIG. 2 is a flowchart showing a part of a main routine of the image processing apparatus according to the embodiment of the present invention.
Figure 3:
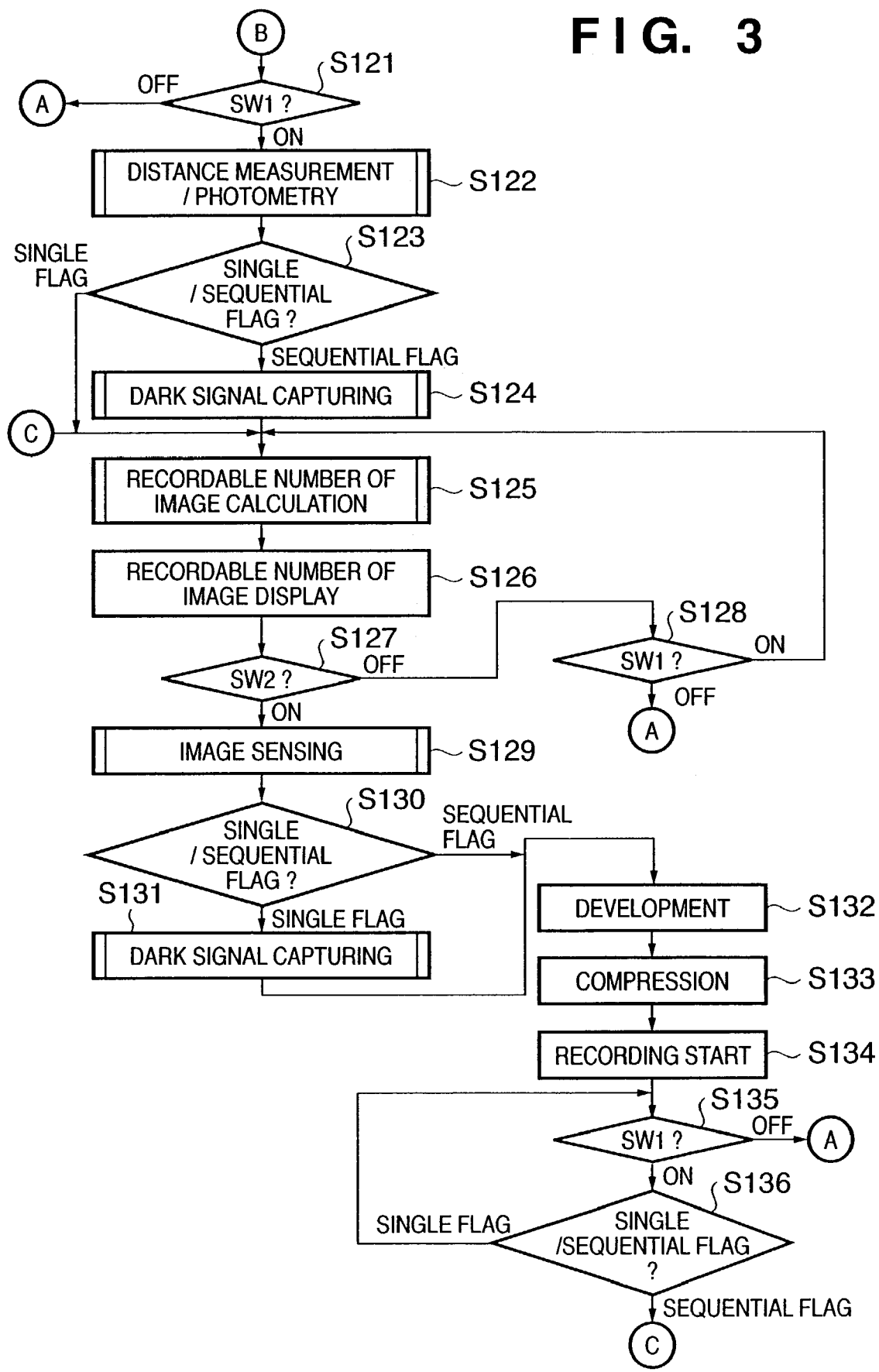
FIG. 3 is a flowchart showing a part of the main routine of the image processing apparatus according to the embodiment of the present invention.

Next, an operation of the image processing apparatus 100 having the aforesaid configuration will be explained. FIGS. 2 and 3 are flowcharts showing processing procedure of image sensing operation of the image processing apparatus 100. When power of the apparatus 100 is turned on by, e.g., exchanging batteries, the system controller 50 initializes flags and control variables and performs other necessary initialization in each unit of the apparatus 100 (step S101).

The system controller 50 detects the state of the power switch 66 (step S102). If the power switch 66 is set OFF, the display of each display unit is changed to the OFF state, and necessary parameters including the flags and control variables, set values, and set modes are stored in the nonvolatile memory 56. Thereafter, a predetermined end process, such as cutting off the unnecessary power supply to units of the apparatus 100, including the image display unit 28, is performed by the power controller 80 (step S103). Then, the process returns to step S102.

Whereas, if the power switch 66 is set ON in step S102, the system controller 50 determines whether or not the remaining amount or operating condition of the power source 86 including batteries causes any trouble in operating the apparatus 100 (step S104). If any trouble is predicted, then a predetermined warning message is notified to a user by the notification unit 54 using images and sound (step S105). Thereafter, the process returns to step S102. Whereas, if no problem is determined in the power source 86 (YES in step S104), the system controller 50 determines the set position of the mode dial 60 (step S106). If the mode dial 60 is set to an image sensing mode, the process proceeds to step S108. Whereas, if the mode dial 60 is set to another mode, the system controller 50 performs a process corresponding to the selected mode (step S107), then the process returns to step S102.

If the mode dial 60 is set to an image sensing mode, the system controller 50 determines whether or not the recording medium 200 or 210 is inserted (step S108). Further, it is also determined whether or not there is any problem in obtaining management information of image data recorded in the recording medium 200 or 210, or whether or not the operating state of the recording medium 200 or 210 may cause any trouble in operation of the image processing apparatus 100, particularly in recording/reproduction operation of image data on/from the recording medium (step S108). If it is determined that a trouble may occur, a predetermined warning message is notified to a user by the notification unit 54 using images and sound (step S105). Thereafter, the process returns to step S102.

If no problem is determined as a result of determining whether or not the recording medium 200 or 210 is inserted, or whether or not there is any problem in obtaining management information of image data recorded in the recording medium 200 or 210, or whether or not the operating state of the recording medium 200 or 210 may cause any trouble in operation of the image processing apparatus 100, particularly in recording/reproduction operation of image data on/from the recording medium (step S108), the process proceeds to step S109.

In step S109, the system controller 50 checks a state of the single/sequential switch 68 for selectively setting a single-shot mode and a sequential mode. If the single-shot mode is selected, a single/sequential flag is set to "single" (step S110). Whereas, if the sequential mode is selected, the single/sequential flag is set to "sequential" (step S111). After setting the flag, the process proceeds to step S121.

The state of the single/sequential flag is stored in an internal memory of the system controller 50 or the memory 52.

After the single/sequential flag is set, the system controller 50 controls to display various setting states of the apparatus 100 by the notification unit 54 using images and sound (step S112). If the display of the image display unit 28 is ON, the various setting states of the apparatus 100 are displayed on the image display unit 28 using images and sound.

Thereafter, whether or not the shutter switch (SW1) 62 is pressed is determined (step S121). If not, the process returns to step S102. If yes, the system controller 50 performs distance measurement to focus the image sensing lens 10 on an object, and performs photometry process to determine an f number (aperture) and shutter speed (step S122). Thereafter, the process proceeds to step S123. Note, in the photometry process, a flash is set in accordance with necessity. The distance measurement and photometry processes performed in step S122 will be described later in detail with reference to FIG. 4.

The system controller 50 determines the state of single/sequential flag stored in the internal memory of the system controller 50 or the memory 52 (step S123). If a single-shot mode is set, the process proceeds to step S125.

Whereas, if a sequential mode is set, a dark signal capturing process is performed (step S124). In this process, while the shutter 12 is closed, a noise component such as a dark current of the image sensing device 14 is accumulated for the same period of time as an actual image sensing operation and the stored noise image signal is read. Thereafter, the process proceeds to step S125.

In step S125, the system controller 50 compares among the number of image recordable in an available capacity of an area where sensed image data is stored in the memory 30 (hereinafter referred to as a RAW buffer), the recordable number of image which is converted from an available capacity of an area where compressed image data is stored in the memory 30 (hereinafter referred to as a JPEG buffer) and the number of images recordable in an available area of the recording medium 200, and obtains the smallest number. Then, the system controller 50 displays the smallest number of images, obtained in step S125, by the 7-segmented indicator in the optical finder 104 shown in FIG. 6. In a case where the recordable number of images in the available area of the recording medium 200 is the smallest, the indicator [ ] is added (step S126). Note that the recordable number calculation process in step S125 and recordable number display process in step S126 will be described later in detail with reference to FIG. 7.

Next in step S127, the system controller 50 determines whether or not the shutter switch (SW2) 64 is pressed. If it is not pressed, the process proceeds to step S128, and steps S125 to S127 are repeated until the shutter switch (SW1) 62 is released. When the shutter switch (SW1) 62 is released, the process returns to step S102.

Whereas if the shutter switch (SW2) 64 is pressed in step S127, the system controller 50 reads an image signal, which has been accumulated for a predetermined period of time, from the image sensing device 14, and writes the read image data in a predetermined area of the memory 30 through the A/D converter 16, image processor 20, and memory controller 22, or through the A/D converter 16 and memory controller 22 (step S129). The image sensing process in step S129 will be described later in detail with reference to FIG. 5.

Upon completion of the image sensing process instep S129, the system controller 50 determines the state of the single/sequential flag stored in the internal memory of the system controller 50 or the memory 52 (step S130). If the flag is set to "sequential", the process proceeds to step S132. Whereas, if the flag is set to "single", a dark signal capturing process is performed (step S131). In this process, while the shutter 12 is closed, a noise component such as a dark current of the image sensing device 14 is accumualted for the same period of time as an actual image sensing operation, and the stored noise image signal is read. Thereafter, the process proceeds to step S132.

The system controller 50 reads a part of the image data written in the predetermined area of the memory 30 through the memory controller 22, performs white balance (WB) integration calculation and optical black (OB) integration calculation, necessary for a development process, and stores results of the calculations in the internal memory of the system controller 50 or the memory 52.

The system controller 50 reads the sensed image data written in the predetermined area of the memory 30 by using the memory controller 22 and, in accordance with necessity, image processor 20, then performs various development processing including auto white balance (AWB) processing, gamma conversion, color conversion and the like, using the calculation results stored in the internal memory of the system controller 50 or the memory 52 (step S132). Furthermore, in the development processing, dark signal correction calculation is also performed to cancel the dark current noise of the image sensing device 14, by performing subtraction using the dark image data captured in the dark signal capturing process.

The system controller 50 reads the image data written in the predetermined area of the memory 30, performs image compression corresponding to a set mode by the compression/expansion circuit 32 (step S133), and writes the image data, which has been sensed and undergone a series of processes, in a blank image buffer area of the memory 30.

After a series of image sensing is executed, the system controller 50 reads the image data stored in the image buffer area of the memory 30, and writes the image data in the recording medium 200 or 210 such as a memory card, compact flash® card or the like, through the interface 90 or 94 and the connector 92 or 96 (step S134).

This recording process is executed with respect to the image data each time new image data, which has been sensed and undergone a series of processes, is written in the blank image buffer area of the memory 30. Note, while image data is written in the recording medium 200 or 210, the notification unit 54 may perform an operation, such as turning an LED on and off, to notify a user of writing operation being carried out. Thereafter, the system controller 50 determines whether or not the shutter switch (SW1) 62 is pressed (step S135).

If the shutter switch (SW1) 62 is not pressed, the process returns to step S102. Whereas, if the shutter switch (SW1) 62 is pressed, the state of the single/sequential flag stored in the internal memory of the system controller 50 or the memory 52 is determined (step S136). If the flag is set to "single", the process returns to step S135, and repeats the current processing until the shutter switch (SW1) 62 is released. Whereas, if the flag is set to "sequential" (step S136), the process returns to step S125 to perform sequential image sensing, and performs the next image sensing.

FIG. 7 is a flowchart showing details of the recordable number calculation process in step S125 and recordable number display process in step S126. The system controller 50 calculates the recordable number of images "a" of the RAW buffer area of the memory 30 based on an available capacity of the RAW buffer area (step S401), then calculates the recordable number of images "b" of the JPEG buffer area based on an available capacity of the JPEG buffer area (step S402), and calculates the recordable number of images "c" of an available area of the recording medium 200 (step S403). Thereafter, the recordable numbers of images in respective recording areas are compared, and the smallest recordable number of images is obtained (step S404). When "a" is the smallest, "a" is displayed by the 7-segmented indicator in the optical finder 104 shown in FIG. 6 (step S405); when "b" is the smallest, "b" is displayed (step S406);when "c" is the smallest, "[c]" is displayed (step S407).

Note since one 7-segmented indicator is used owing to the limited display area, the maximum value of the recordable number of images in the optical finder 104 is shown as 8. However, in a case where there is enough display space, the value is not limited to this example.

As set forth above, according to the foregoing embodiment, since the smallest recordable number of images is displayed based on the remaining capacity of the storage medium and the remaining capacity of the recording medium, it is possible to realize an image processing apparatus having an excellent usability, which can avoid failure of sequential image sensing caused by not realizing the remaining capacity of the recording medium running low.

Figure 4:
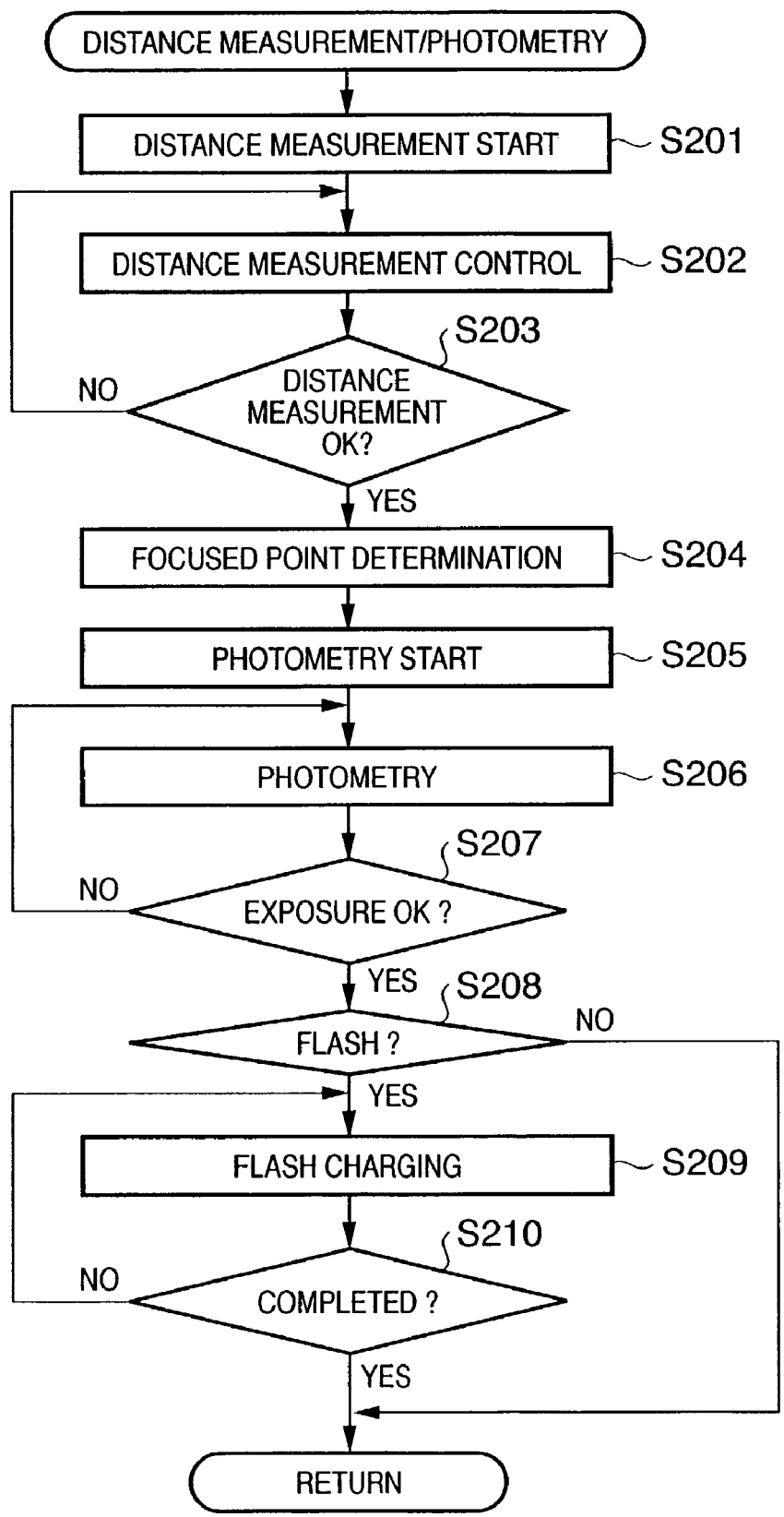
FIG. 4 is a flowchart showing a distance measurement/photometry routine of the image processing apparatus according to the embodiment of the present invention.

FIG. 4 is a flowchart showing details of the distance measurement and photometry processes in step S122 in FIG. 3. Note in the distance measurement and photometry processes, the system controller 50 and the aperture controller 340 or distance measurement controller 342 exchange various signals through the interface 120, connector 122, connector 322, interface 320, and lens controller 350.

The system controller 50 starts autofocus (AF) processing using the image sensing device 14, distance measurement unit 42, and distance measurement controller 342 (step S201). In the AF processing, the system controller 50 directs a ray of light incident upon the lens 310 to the distance measurement unit 42 through the aperture 312, lens mounts 306 and 106, mirror 130, and distance-measurement sub-mirror (not shown). Then, the focus state of the optical image, which is formed in the foregoing process, is determined. Until it is determined that the image is focused (step S203), AF control is continued to detect the focus state using the distance measurement unit 42 while driving the lens 310 using the distance measurement controller 342 (step S202).

After the focus state is determined by the distance measurement (AF) process (YES in step S203), the system controller 50 determines a focused point among a plurality of focus points in the image sensing screen, stores focusing data and/or set parameters along with the determined focused point data in the internal memory of the system controller 50 or the memory 52. Thereafter, the process proceeds to step S205. Next, the system controller 50 starts auto exposure (AE) processing using the photometry unit 46 (step S205).

The system controller 50 directs a ray of light incident upon the lens 310 to the photometry unit 46 through the aperture 312, lens mounts 306 and 106, mirrors 130 and 132, and photometry lens (not shown). Then, the exposure state of the optical image, which is formed in the foregoing process, is determined. Until it is determined that the exposure is appropriate (step S207), the photometry process is performed using the exposure controller 40 (step S206).

After it is determined that the exposure is appropriate (YES in step S207), the system controller 50 stores the photometry data and/or set parameters in the internal memory of the system controller 50 or the memory 52. Thereafter, the process proceeds to step S208. Note, based on the exposure result detected by the photometry process (step S206) and the image sensing mode set by the mode dial 60, the system controller 50 determines an f number (Av) and shutter speed (Tv). In accordance with the shutter speed (Tv) determined herein, the system controller 50 determines charge accumulation time of the image sensing device 14, and respectively performs the image sensing process and dark signal capturing process for the equal charge accumulation time.

Based on the data obtained by the photometry process (step S206), the system controller 50 determines whether or not it is necessary to use a flash (step S208). If YES, a flash flag is set, and the flash 43 is charged (step S209) until flash charging is completed (step S210). Upon completion of the flash charging (step S210), the distance measurement and photometry routine (step S122) ends.

Figure 5:
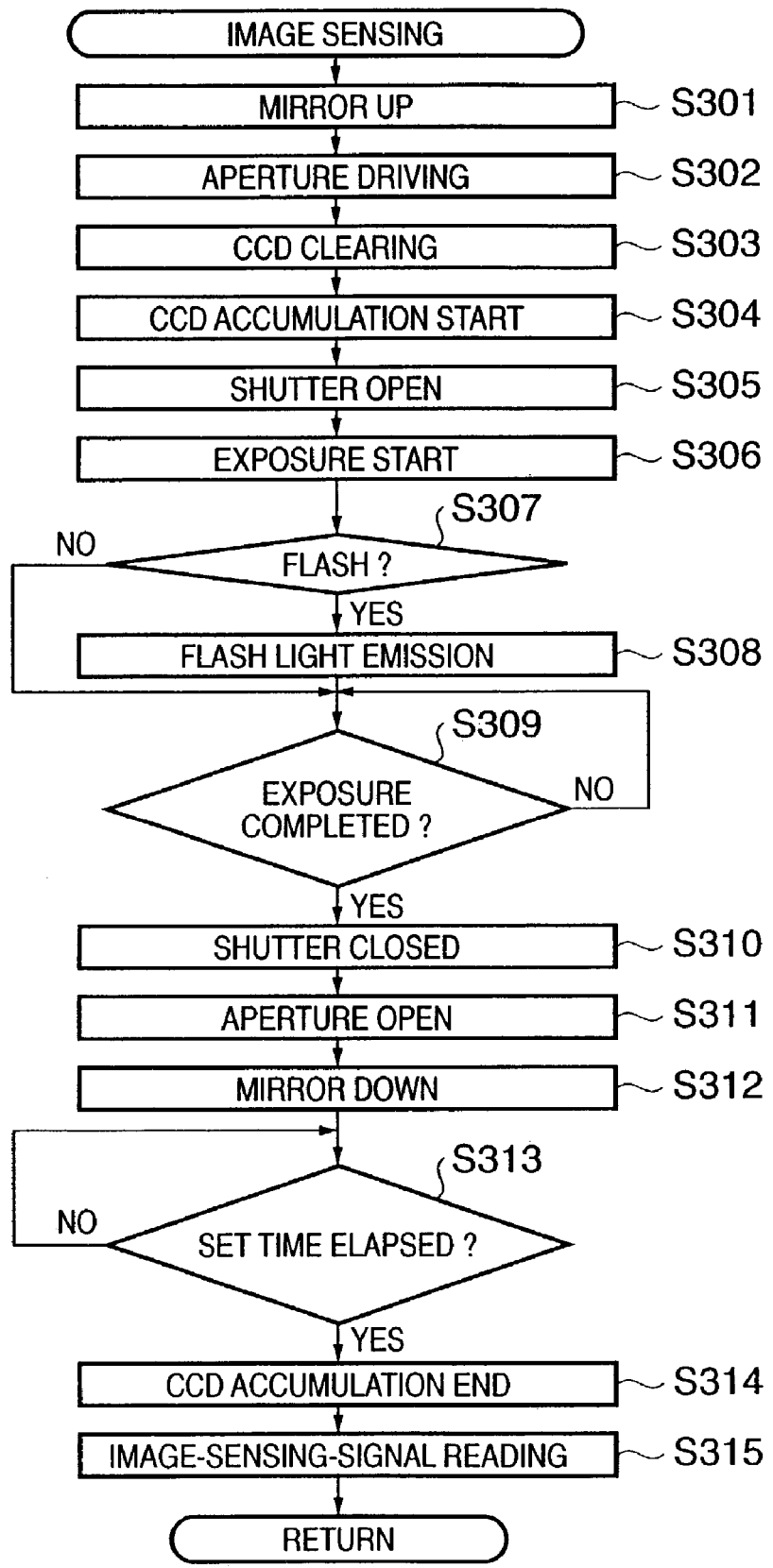
FIG. 5 is a flowchart showing an image sensing routine of the image processing apparatus according to the embodiment of the present invention.

FIG. 5 is a flowchart showing details of image sensing process in step S129 in FIG. 3. Note in the image sensing process, the system controller 50 and aperture controller 340 or distance measurement controller 342 exchange various signals through the interface 120, connector 122, connector 322, interface 320, and lens controller 350.

The system controller 50 moves the mirror 130 to a predetermined position (mirror-up position) outside an optical path by a mirror driver (not shown) (step S301), and drives the aperture 312 to a predetermined f number by the aperture controller 340 based on the photometry data stored in the internal memory of the system controller 50 or the memory 52 (step S302). The system controller performs charge clearing of the image sensing device 14 (step S303), and starts charge accumulation of the image sensing device 14 (step S304). Then, the system controller 50 opens the shutter 12 using the shutter controller 40 (step S305), and starts exposure of the image sensing device 14 (step S306).

Next, whether or not the flash 48 is necessary is determined based on the flash flag (step S307). If YES, the flash is set off (step S308). The system controller 50 awaits for completion of the exposure of the image sensing device 14 in accordance with the photometry data (step S309), closes the shutter 12 by the shutter controller 40 (step S310), and ends the exposure of the image sensing device 14.

The system controller 50 drives the aperture 312 up to an open aperture value by the aperture controller 340 (step S311), and moves the mirror 130 to a predetermined position (mirror-down position) in the optical path by the mirror driver (not shown) (step S312). After an elapse of the set charge accumulation time (step S313), the system controller 50 ends the charge accumulation of the image sensing device 14 (step S314), and reads charged signals from the image sensing device 14. The sensed image data is written in a predetermined area of the memory 30 through the A/D converter 16, image processor 20, and memory controller 22, or through the A/D converter 16 and memory controller 22 (step S315). Upon completion of the series of processes, the image sensing routine (step S129) ends.

In the above description of the embodiment, although the mirror 130 is moved to the mirror-up position for an image sensing operation and moved back to the mirror-down position after the image sensing operation, the mirror 130 may be a half mirror and an image sensing operation may be performed without moving the half mirror.

Further, in the above description of the embodiment, although single/sequential image sensing is selected by the single/sequential switch 68, an operation-mode selection function of the mode dial 60 may be used to select the single/sequential image sensing.

Note, for the recording medium 200 or 210, not only a memory card such as a PCMCIA card, a compact flash® card or the like, and hard disk can be employed, but also a micro DAT, a magneto-optical disk, an optical disk such as CD-R or CD-RW, a phase-change optical disk such as DVD and the like may be employed. Further, the recording medium 200 or 210 may be of a combined medium integrally incorporating a memory card and a hard disk. Moreover, a part of the combined medium may be detachable.

Further, in the above description of the embodiment, although the recording media 200 and 210 are independent of the image processing apparatus 100 and are arbitrarily connectable to the apparatus 100, a part of or all of the recording media may be fixed to the image processing apparatus 100. Moreover, a single or a plurality of recording media 200 (or 210) may be connected to the image processing apparatus 100. Further, although the above description explains that one recording medium 200 and one recording medium 210 are inserted to the image processing apparatus 100, it is possible to configure the apparatus 100 so that an arbitrary combination of a single or a plurality of recording media 200 and a single or a plurality of recording media 210 may be inserted to the apparatus 100.

OTHER EMBODIMENT

The object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as ROM, RAM, a floppy disk, a hard disk, an optical disk, a magneto-optical disk, CD-ROM, CD-I, CD-R, CD-RW, zip, a magnetic tape, and a non-volatile type memory card, and computer network, such as LAN (local area network) and WAN (wide area network), can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

In a case where the present invention is applied to the aforesaid storage medium, the storage medium stores program codes corresponding to the flowcharts shown in FIGS. 2 to 5 and 7 described in the embodiment.

The present invention is not limited to the above embodiments and various changes and modifications can be made within the spirit and scope of the present invention. Therefore to apprise the public of the scope of the present invention, the following claims are made.

What is claimed is:

1. An image recording apparatus having a first buffer for buffering RAW data, a second buffer for buffering compressed image data, and a recording unit for recording the data buffered in said first or second buffer on a recording medium, said apparatus comprising:

an available recording capacity detection unit that detects available recording capacities of said first buffer, said second buffer, and said recording medium;

a comparison unit that compares the available recording capacities of said first buffer, said second buffer, and said recording medium detected by said available recording capacity detection unit; and a display unit that displays information regarding a smallest one of the available recording capacities based on a comparison result of said comparison unit.

2. The image recording apparatus according to claim 1, wherein said display unit displays, together with the information regarding the smallest available recording capacity, information regarding whether or not the smallest available recording capacity is an available recording capacity of the recording medium.

3. An control method of an image recording apparatus having a first buffer for buffering RAW data, a second buffer for buffering compressed image data, and a recording unit for recording the data buffered in said first or second buffer on a recording medium, said method comprising:

detecting available recording capacities of said first buffer, said second buffer, and said recording medium;

comparing the detected available recording capacities of said first buffer, said second buffer, and said recording medium; and displaying information regarding a smallest one of the available recording capacities based on a comparison result.

4. A storage medium readable by a data processing apparatus, said storage medium storing a program which is executable by the data processing apparatus and comprises program codes realizing the control method described in claim 3.

* * * * *